Nov. 3, 1942. C. D. RUSSELL 2,300,704
MACHINE FOR CLEANING PACKED CANS
Filed Dec. 11, 1939 5 Sheets-Sheet 1

Inventor
Clyde D. Russell
By Lyon & Lyon
Attorneys

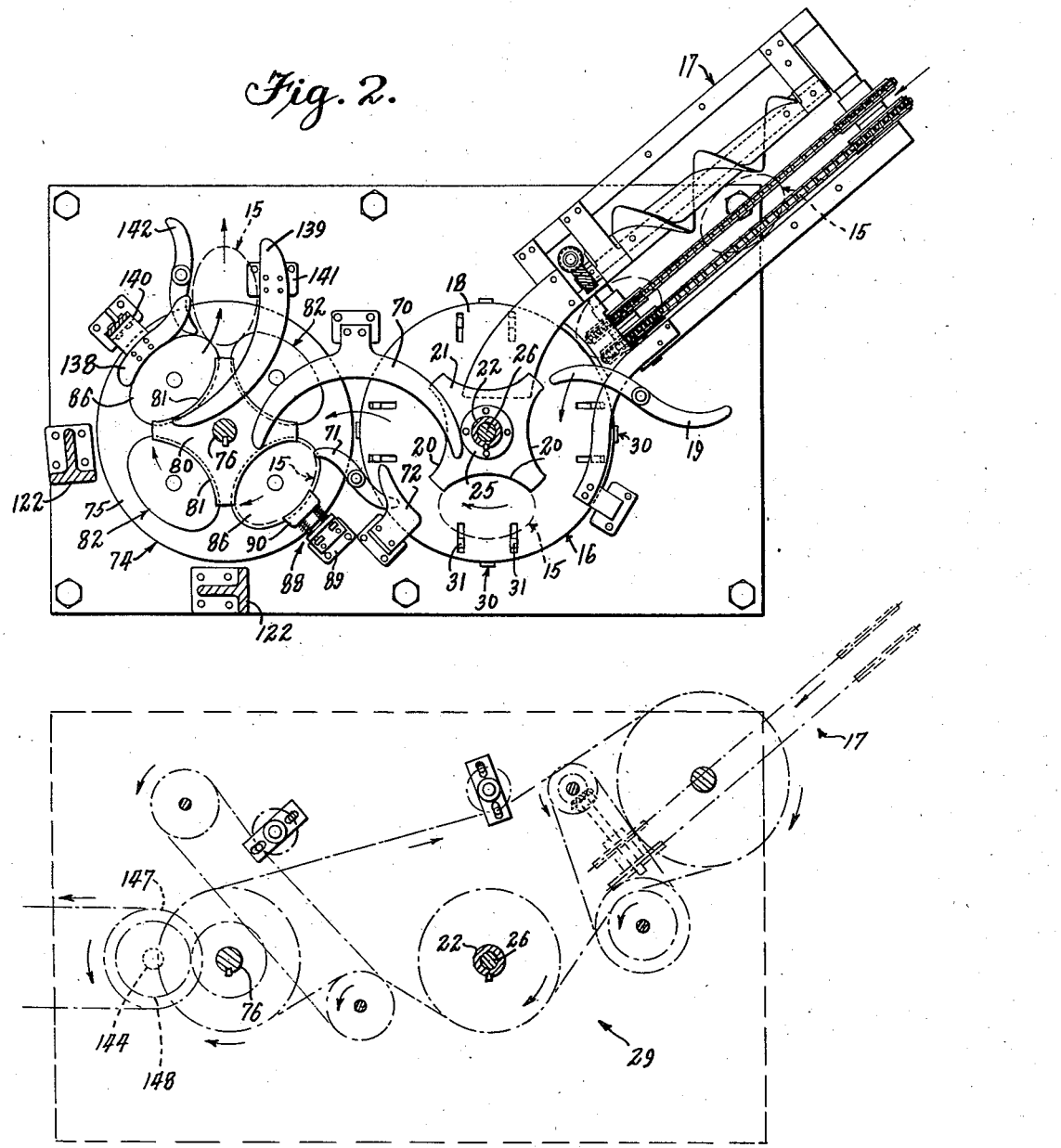

Nov. 3, 1942.   C. D. RUSSELL   2,300,704
MACHINE FOR CLEANING PACKED CANS
Filed Dec. 11, 1939   5 Sheets-Sheet 3

Inventor
Clyde D. Russell
By Lyon & Lyon
Attorneys

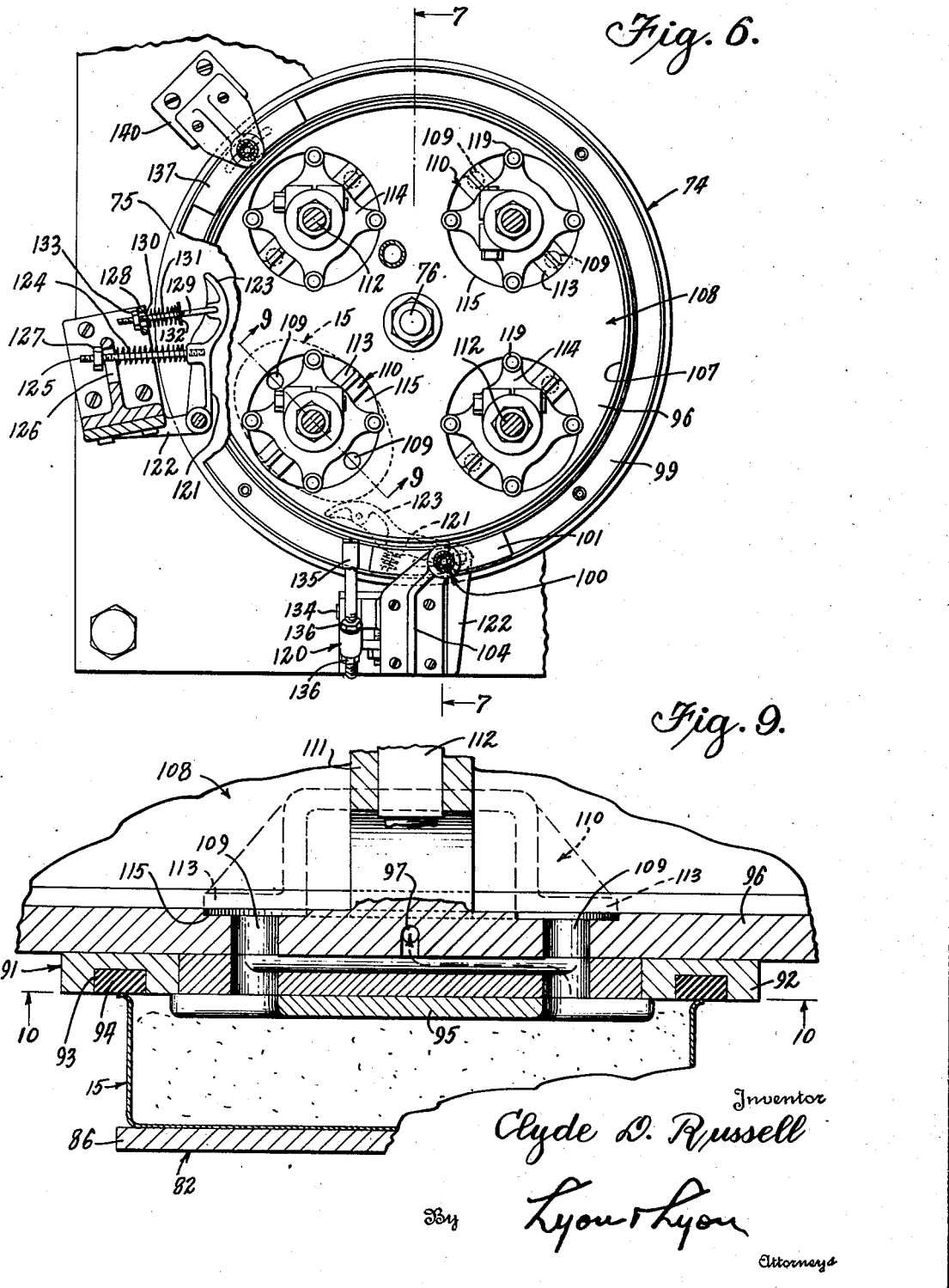

Patented Nov. 3, 1942

2,300,704

UNITED STATES PATENT OFFICE 2,300,704

MACHINE FOR CLEANING PACKED CANS

Clyde D. Russell, Oakland, Calif., assignor to California Packing Corporation, San Francisco, Calif., a corporation of New York Application December 11, 1939, Serial No. 308,657

4 Claims. (Cl. 226—71)

This invention relates to a machine for cleaning the seaming flange of open ended elliptical cans packed with sardines and for then filling such cans to a predetermined level with sauce.

In canning sardines, after the cans are packed with the fresh fish they are passed through a pre-cooker where excess moisture and oil are removed. This pre-cooking operation causes the hard bony parts such as the fins and bones to cook away from the flesh of the fish. Following the pre-cooking operation the cans are passed over a drum to temporarily invert the cans for draining. During the inverting process of the cans their contents are naturally upset and somewhat displaced; however, the drum acts to confine the fish within the can.

The displacement of the fish together with the draining of the liquid from the cans tends to leave small portions of the fish flesh, bones and fins lodged on or protruding over the seaming flange when the cans are turned right side up. After the draining operation the cans pass a sauce filler valve operated by the can where a given amount of sauce is added to each can regardless of the net weight of the fish. The cans then pass to a closing machine where the can covers are mounted on the seaming flanges of the cans and the seaming flanges are partially curled. During the curling operation, the fish flesh, bones or fins which have lodged on or protruded over the seaming flange of the can during the draining operation, are trapped in the seam and prevent the metal of the can from making a perfect closure and results in what is known in the art as cut seams or breaks in the seam at the location of such foreign matter resulting in a defective closing operation and a ruined pack.

The net weight of the fish placed in the can varies and if the same amount of sauce is placed in each can, the final weight of the cans will likewise, vary, causing some cans to be light weight and others to be over-weight.

It is one of the principal objects of this invention to avoid these difficulties by providing a machine and method for overcoming the objectionable features above pointed out, namely in providing a machine which will automatically clean the seaming flange of the can and present the clean can to a sauce adding mechanism wherein the sauce will be added to the cans to a predetermined level irrespective of the weight or volume of fish in the can and thus presenting to the can closing machine filled cans having clean seaming flanges and of substantially the same uniform weight, and further as all cans are filled to the same predetermined level the necessary head space for the closing operation will be provided.

It is a further object to provide means for compressing and compacting the contents of the can while cleaning the seaming flange thereof.

It is a further object to provide simple and effective means for cleaning the seaming flange of filled cans.

It is a further object to add to each can, sauce until it reaches a predetermined level.

It is a further object to temporarily seal the clean seaming flange of these packed cans and to thereafter apply vacuum for a predetermined length of time before opening the sealed can to a supply of sauce and thereafter communicating the can with atmosphere pressure.

It is a further object to provide a displacement pad for predetermining the level of sauce in the cans.

It is a further object to provide means for rendering the sauce adding mechanism inoperative to add sauce unless a can is presented for filling.

It is a further object to provide a machine which is simple, effective, rapid in operation and inexpensive in manufacture.

The machine of this invention has been illustrated as adapted to clean and fill elliptical sardine cans. It is to be understood, however, that the machine may be arranged to operate just as efficiently upon round cans packed with fish or other products.

Other objects and advantages of the invention will become apparent as the nature of the same is more fully understood from the following description and accompanying drawings wherein it is set forth what is now considered to be a preferred embodiment. It should be understood, however, that this particular embodiment of the invention is chosen principally for the purpose of exemplification, and that variations therefrom in detail of construction or arrangement of parts may accordingly be effected and yet remain within the spirit and scope of the invention as the same is set forth in the appended claims.

In the drawings:

Fig. 2 is a plan section, taken substantially on line 2—2 (Fig. 1) illustrating the course of travel of the sardine cans from the "feed in" over the respective turrets to the "exit."

Fig. 3 is a diagrammatic plan section, taken substantially on line 3—3 (Fig. 1), illustrating the chain drive for the various feed and rotatable elements.

Fig. 6 is an enlarged plan view, partly in section, of the sauce tank and valve elements.

Fig. 9 is an enlarged longitudinal section of one of the temporary sealing means taken substantially on line 9—9 (Fig. 6).

The drawings illustrate a preferred embodiment of the invention as the same has been commercially employed in treating a substantial number of cans. It will be understood, however, that many variations from the specific embodiment of the drawings may be made without changing or affecting the inventive concept disclosed therein. As for example, the machines employ two rotating turret heads, one for cleaning, the other for adding sauce to the cans. These two separate turrets might be consolidated so that the cleaning and filling operations could be performed in the same turret, or, on the other hand, the turrets may be dispensed with and the operation carried on during intermittent travel of the cans along a conveyor system, as will be readily understood by those skilled in the art.

Figure 1:
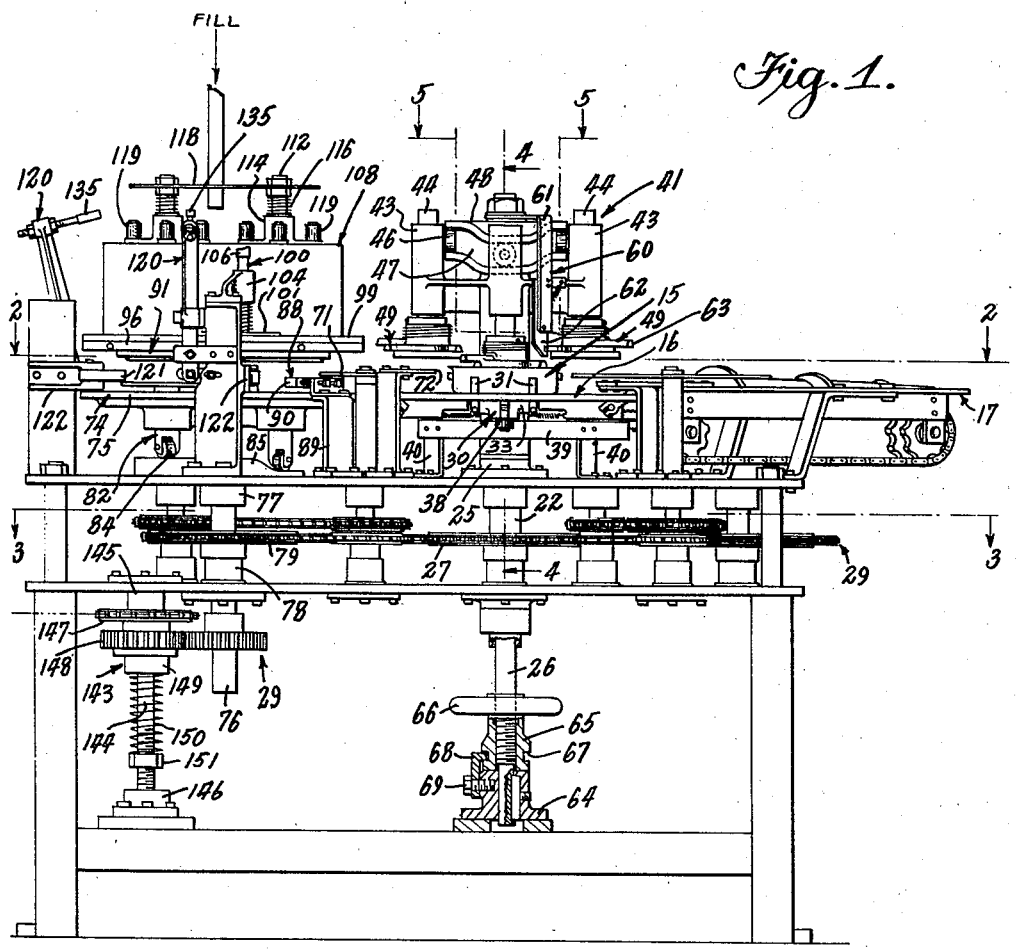
Fig. 1 is a front elevation of the entire machine.

As shown in Figs. 1 and 2, the elliptical sardine cans 15 are fed to the cleaning turret 16 by means of a screw conveyor 17. As this type of conveyor is well known and of itself does not form a part of this invention, it will not be described in detail. It will be understood that any other form of conveying means may be employed which would deliver cans in timed relation to the operation of the cleaning turret 16.

Figure 4:
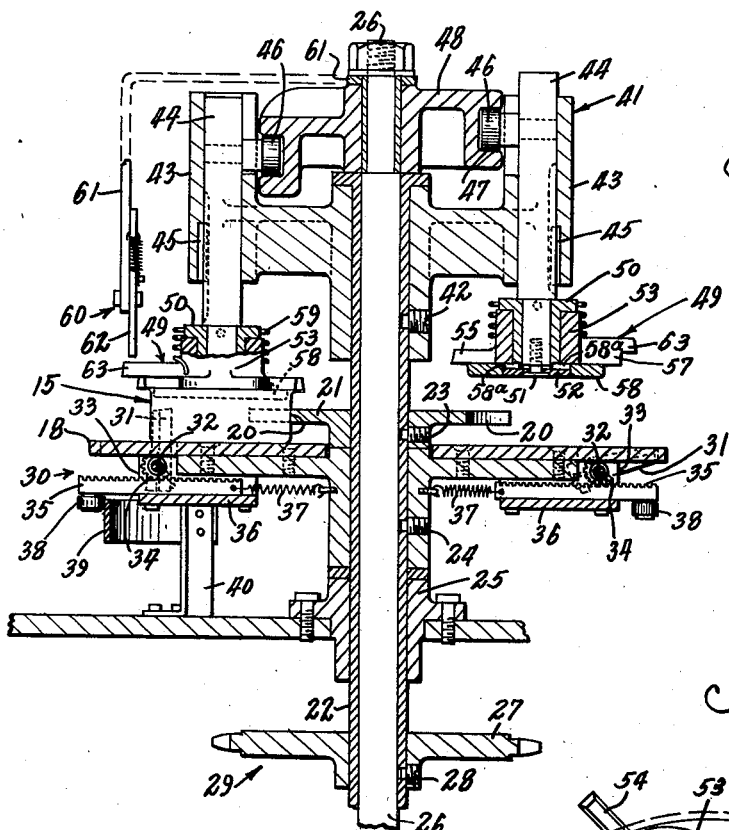
Fig. 4 is a vertical section, on an enlarged scale, taken substantially on line 4—4 (Fig. 1) and illustrating a sardine can in position just after its seaming flange has been cleaned by the cleaning element.

The cans are delivered from the feed conveyor 17 onto the table 18 by the feed gate 19, an element likewise common in the conveying and presenting of elliptical cans in timed relation into treating machines. Positioned above the turret table 18 and having four arcuate notches 20 is a can aligning disc 21 (Figs. 2 and 4). The can aligning disc 21 may be formed integral with the table or may be constructed as best shown in Fig. 4, wherein this disc is keyed to the table supporting and rotating sleeve 22 by any suitable means, such as the set screw 23. In like manner the hub of the turret table 18 is secured to sleeve 22 by means of the set screw 24. The table supporting sleeve 22 is journaled in the frame bearing 25 as well as by means of the stationary supporting shaft 26. For the purpose of rotating the turret sleeve a sprocket 27 is keyed to the lower end thereof by means of the set screw 28. The sprocket 27 is included in the driving mechanism 29 (Fig. 1), which mechanism is arranged to drive the several units of the machine in timed relation.

In order to insure the proper register of the cans in the arcuate notches 20 and for clamping the located cans during the cleaning operation, a can-clamping mechanism 30 is provided. This can clamping mechanism may include a pair of spaced fingers 31 extending upwardly through suitable slots formed in the turret table and rigidly mounted upon an operating shaft 32 journaled in bearings 33 located on the under side of the turret table 18. Fastened to the mid portion of shaft 32 is a segmental gear 34 meshing with rack 35 slidably mounted in bearing block 36 carried by the table and normally maintained in its retracted position by spring means 37 in which position the clamping fingers 31 are retracted as shown in the righthand side of Fig. 4. A cam roller 38 is journaled upon the under forward end of rack 35 and arranged to travel along the segmental cam rail 39 (Figs. 1 and 4). This cam rail is positioned to engage roller 38 at about the same time a can is delivered into one of the arcuate notches by the feed conveyor 17 and feed gate 19 so as to advance the rack against the tension of its spring 37 and thereby swinging its fingers to engage and position the can into registration with the notch 20 and to so hold the can during the cleaning operation. The segmental cam rail terminates just prior to the discharge of the can from the cleaning turret thereby permitting the clamping fingers 31 to return to their retracted positions.

It will be understood that there are 4 of these can centering and holding devices, one for each of the turret centering notches 20 and that the segmental cam rail 39 may be supported from the frame work of the machine in any preferred manner as for example, by the brackets 40 as shown in Fig. 4.

The cleaning turret rotates continuously and each time one of the arcuate notches 20 arrives at the loading station, a can is presented thereto by the feed conveyor 17 and feed gate 19. In this way a substantially continuous stream of elliptical cans may be fed to the cleaning turret, centered thereon and after the cleaning operation released and transferred to the turret of the can filling portion of the machine. The receiving of the can by the cleaning turret and its transfer to the filling turret takes place in slightly over one half revolution of the cleaning turret and it is during the conveyance of each can by the cleaning turret that means are brought into engagement with the flange which extends around the open end of the can to clean from this flange all foreign matter such as misplaced fins, bones, and flesh of the fish which may have lodged on or protrude over the flange.

This cleaning operation is extremely important because if the flange is not cleaned before it arrives at the can closing machine, the cover when assembled to the can will trap this foreign material between the flange and cover and as a result, when the flange is curled and crimped over the cover to seal the can, the foreign material will cause an imperfect closure which in many cases will result in fractured plates commonly referred to as cut seams causing the defective portion of the seam to leak resulting in a ruined pack. The flange which extends around the open end of the can upon which the cover is to be assembled is referred to herein as the seaming flange.

It will be understood that many different types and forms of cleaning means may be employed to remove the foreign matter from the seaming flange of the can during its travel on the cleaning turret.

The preferred form of the cleaning means which I have shown in the drawings has proven successful in a number of machines treating thousands of cans and includes a turret head 41 keyed to the upper end of the turret sleeve 22 by means of set screw 42. The turret head 41 is provided with 4 vertical bearing bosses 43, one for each of the arcuate centering notches 20 and positioned above and in alignment therewith. As the four cleaner heads are identical the description will be confined to one.

In each bearing boss 43 there is reciprocably mounted a cleaner head plunger 44 held against rotation by key means 45 and to the upper end of said plunger is suitably journaled a cam roller 46 arranged to travel in the cam groove 47 of the stationary cam disc 48, fixedly mounted to the upper end of the supporting shaft 26 (Fig. 4). The cam groove 47 is of appropriate contour (Fig. 1) to reciprocate the cleaning head plunger through a predetermined range of travel. A seaming flange cleaner head is operatively mounted upon the lower end of plunger 44 and includes a flange sleeve 50 (Fig. 4) fixed to the lower end of plunger 44 by means of a suitable screw 51 and washer 52. Journaled upon the body portion of sleeve 50 is the rotary cleaner member 53 having four radially extending seaming flange cleaning blades 54, 55, 56 and 57 spaced 90 degrees apart.

Figure 5:
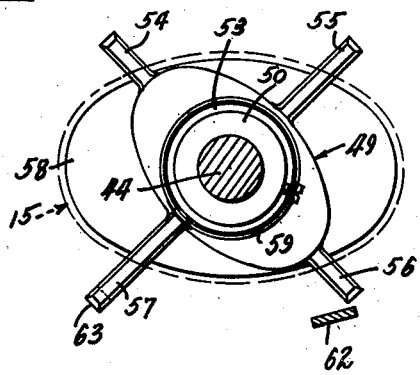
Fig. 5 is an enlarged plan view, partly in section, of one of the cleaning elements and taken substantially as viewed from line 5—5 (Fig. 1).
Figure 10:
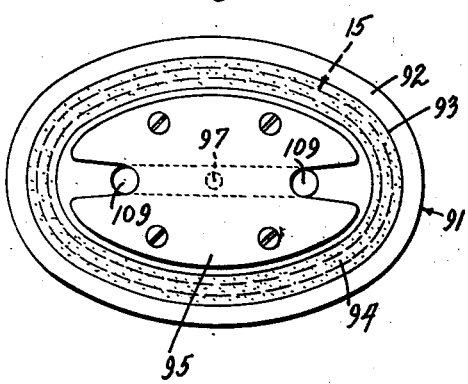
Fig. 10 is a bottom plan view of sealing means as viewed from the line 10—10 (Fig. 9) on a slightly reduced scale.

As may be observed in Fig. 5, the two cleaning blades 54 and 56 which traverse the narrow portion of the can may be made shorter than the longer cleaning blades 55 and 57 which traverse the end portions of the can.

At this time it may be well to point out that due to the concentric rotation of the cleaning blades acting upon the elliptical flange gives these cleaning blades a wiping action as they travel along the flange thus greatly increasing their cleaning effect.

A presser or compacting pad 58 (Figs. 4 and 5) is locked to sleeve 50 by key means 58a in such position as to register with the cans during the cleaning operation. This pad 58 acts to compress and compact the sardines within the can and to hold them so compacted during the cleaning operation. It will be appreciated of course that there are many ways of effectively rotating the cleaning head when brought into operative engagement with the seaming flange of the can.

The means which I have shown in the drawings have proven to be simple and effective in actual practice and include connecting one end of the torsional spring 59 to the flange of sleeve 50 and the other end to the rotary cleaner head 49 and to provide a stop means 60 mounted upon the frame of the machine and positioned to engage the cleaner head 49 during the travel of the turret and to thereby wind up this torsional spring to develop sufficient force to rotate cleaning blades a quarter turn or more when the cleaner head is released from the stop means substantially as the cleaning blades are brought into contact with the seaming flange of the can. Thus, with the release of the cleaner head, the torsional spring will drive the head through slightly more than a quarter turn which is sufficient to cause the four cleaning blades to travel across the entire circumference of the seaming flange.

The stop means may include fastening to the upper end of the supporting shaft 26 a right angle bracket 61 and mounting a spring weighted stop trigger 62 on the lower end thereof which trigger is in position to engage the lug 63 formed on the upper surface of cleaner blade 57 (Figs. 1 and 4). The location of the stop trigger 62 is clearly shown in Figs. 1 and 4 and is in such position as to engage lug 63 during the initial travel of the can on the turret and to thus wind the torsional spring 59 as the plunger 44 is moved downwardly to bring the cleaning blades into contact with the seaming flange and to disengage the lug permitting the torsional spring to drive the cleaning blades through their cleaning operation at about the same time the blades are brought into cleaning engagement with the flange of the can. This cleaning action takes place almost instantaneously upon release of the lug and due to the quick action of the cleaner caused by the tension spring the cleaning operation is very effectively performed.

As will be observed from the figures, the lug 63 against which the stop member acts, is positioned above the upper surface of the other three cleaning blades and therefore upon release of the cleaner head it may rotate freely without further engagement with the stop means. The stop trigger 62 is spring weighted so that should the lug 63 engage it during the rebound of the cleaning head the trigger may yield under this action.

As previously pointed out, the table 18 and head 41 of the turret rotate as one member, each cleaning head 49 will travel in unison and alignment with the can received on the table for cleaning. After the cleaning operation has been completed the cam roller 46 engages the upwardly inclined portion of the cam groove lifting the cleaner head 49 from its engagement with the can flange.

Means are provided for adjusting the cleaner heads 49 to cans which may vary in height and this means is shown in Fig. 1 and may include a bearing 64 for slidably but not rotatably supporting the lower end of the supporting shaft 26. The portion of shaft 26 above bearing 64 is threaded and provided with a correspondingly threaded sleeve 65 having at its upper end an adjusting wheel 66 and at its lower end an annular groove 67 by means of which the nut is held against upward movement by key 68 fastened to bearings 64 as by means of screw 69. Through the operation of this mechanism, it will be appreciated that to turn the adjusting wheel 66 in one direction will cause the supporting shaft 26 to be elevated and, as the cam disc 48 is fastened to the upper end of the supporting shaft it will be elevated with the shaft carrying upwardly the cam groove 47 and the cleaner head mechanism through the cam roller 46 and plunger 44 thus elevating the cleaner heads to suit the height of cans to be run. Operation of the adjusting wheel 66 in the opposite direction will lower the cleaner heads to suit cans of less height. In other words, through this adjusting means the cleaner heads may be brought into proper cleaning adjustment with the height of the cans to be treated. A slight amount of play in the low portion of the cam groove may be provided to enable the cleaner head 49 to adjust itself to cans which vary slightly from a given standard in height.

After the cleaning operation, a further rotation of the cleaning turret brings about a release of the can clamping means in the manner previously described and brings the can to the transfer station where a moon-shaped guide member 70 directs the cans from the cleaner turret to the filler turret. A rotary transfer gate 71 (Fig. 2) assists in this transfer. A guide bracket 72 may be provided to prevent the cans from being thrown from the cleaner turret during the release of the can clamping means. The guide brackets 70 and 72 are suitably mounted upon the machine frame.

The can filling portion of the machine includes a turret 74 of a construction somewhat different from the cleaner turret. As may be observed most clearly in Fig. 7, the filler turret 74 includes a table 75 securely fastened to rotate with the turret shaft 76 journaled in bearings 77 and 78 (Fig. 1). The shaft is arranged to be driven in timed relation with the other operating portions of the machine by the driving mechanism 29 and for this purpose shaft 76 intermediate the bearings 77, 78, is provided with a sprocket wheel 79. Keyed to the shaft 76 directly above the turret table is an aligning disc 80 having four arcuate notches 81 (Figs. 2 and 7) which correspond to the aligning disc 21 of the cleaning turret. The turret table 75 is provided with four can elevating devices 82 and there is one of these elevating devices for each notch in the aligning disc 80. The four elevating devices 82 are alike; therefore but one will be described.

Figure 7:
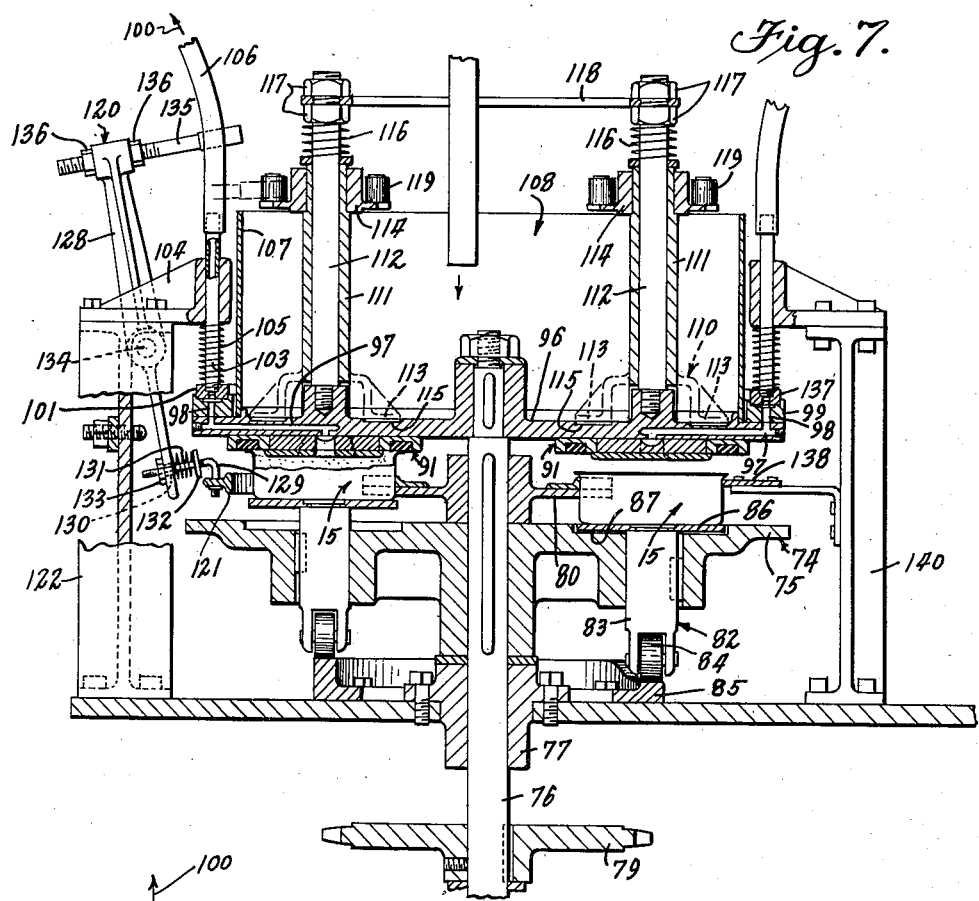
Fig. 7 is a vertical section through the sauce tank, taken substantially on the line 7—7 (Fig. 6) but at the approximate moment when the valve elements have reached "dead center" with respect to the indicating section line 7—7.

Attention is directed to Fig. 7 where each of the elevating devices is shown to include a shaft 83, slidably but non-rotatably mounted in and extending through the turret table, and carrying at its lower end a cam roller 84 arranged to travel around the annular elevating cam 85 which cam is securely mounted upon the frame of the machine. A can platform 86 is securely mounted upon the upper end of shaft 83 and this can platform 86 when in its retracted position nests in recess 87 formed in the top of the turret table to permit the cans to be conveyed to, and positioned in treating register. The can elevating cam 85 is arranged to retract the can elevating device during the transfer of the cans from the cleaning turret and thereafter to elevate the can into sealing register with the filling mechanism and following the sealing operation to return the elevating device to its retracted position in order to enable the filled can to be discharged from the machine and to receive the next can from the cleaning turret.

Referring to Figs. 1 and 2, attention is directed to the spring weighted can positioning means 88 supported from the frame of the machine by means of bracket 89. This can positioning means includes a spring weighted block 90 which is arranged to engage the transferred can and yieldingly thrust the can into the arcuate notch of the aligning disc 80 and to hold the can so pressed while the elevating device 82 has operated to lift the can into sealing relation with the can filling means. After the turret has rotated to carry the can past the can positioning means, the can will be securely clamped against the can sealing means and will thus be securely retained in proper position on the turret during the filling operation.

Various means may be used for temporarily sealing the can but I have found the means shown in the drawings to be very satisfactory in actual practice.

There is provided a separate temporary sealing means 91 for each of the can elevating devices 82. As these sealing means are alike, the description will be limited to one.

Each of these temporary sealing means includes a plate 92 (Figs. 7 and 8) having an elliptical channel 93 in which there is mounted a resilient sealing material 94 preferably formed of soft rubber against which sealing material 94 the flange of the can is elevated into sealing engagement by the elevating device and so maintained during the can filling operation.

An oval displacement pad 95 is fastened to the plate 92 and is arranged to project into the interior of the can when elevated into sealing relation whereby after the can has been filled and lowered away from the sealing means, the fluid or sauce in the can will stand at a predetermined level below the seaming flange of the can, thereby providing the necessary head space in the can and insuring that all cans will be filled to the same predetermined level whether the can is packed to a greater or less extent with fish.

This arrangement also serves to insure that all cans irrespective of the amount of fish placed therein will be of substantially the same standard weight after the cover has been sealed thereon. The cleaning of the seaming flanges of the cans prior to their elevation into engagement with the resilient sealing material greatly assists in perfecting this temporary seal and also insures a longer life for the sealing material as the bones, fins, or other parts of the fish are not constantly being forced into the sealing material. Therefore, the cleaning of the cans prior to the filling operation is one of the important features of this invention.

The several temporary can sealing means 91 are mounted upon the under surface of the main sealing disc 96. The disc 96 is securely fastened to the upper end of the turret shaft 76 and keyed to rotate therewith in unison with the turret table 75.

After a can has been elevated into sealing engagement with one of the sealing means 91, it is ready for the filling operation. This filling operation in this disclosure includes the supplying of sauce to the can; however, it will be understood that oil or other liquid could be supplied in place of the sauce.

Figures 11, 12:
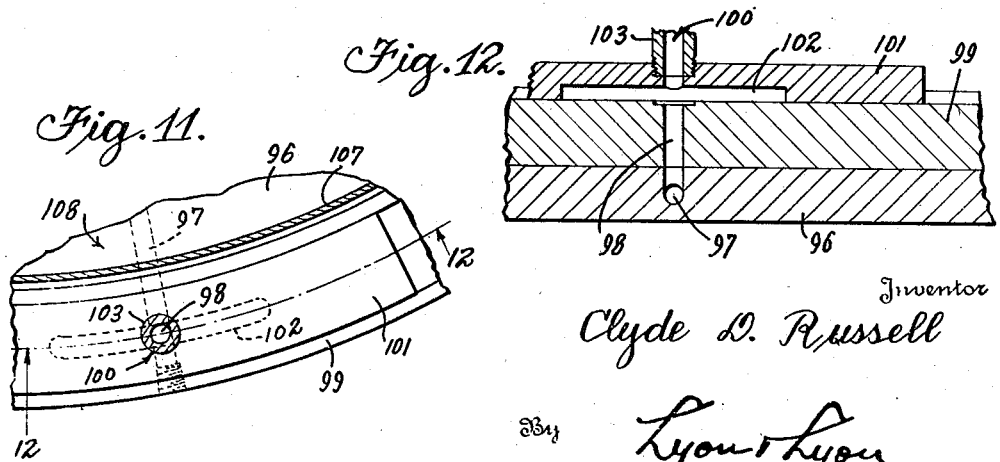
Fig. 11 is an enlarged plan view of the vacuum end of the valve shoe illustrated in Fig. 6.
Fig. 12 is a longitudinal section through this shoe, taken substantially on line 12—12 (Fig. 11) illustrating the communication between said shoe and turret base at the moment said base is in full alignment therewith.
Figure 8:
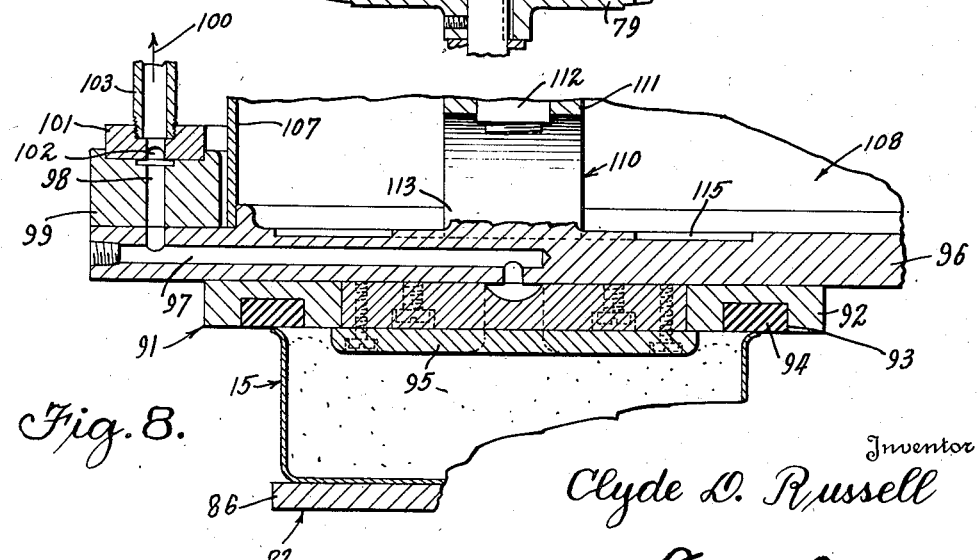
Fig. 8 is an enlarged section of one of the "filler-seal-pads" as shown in Fig. 7.

In order to insure the proper filling of the can with sauce, it is desirable to first vacuumize the temporarily sealed can and for this purpose the sealing disc 96 is provided with a passage 97 for each of the temporary sealing means 91. The passage 97 communicates the sealed can with a valve port 98 (Figs. 8 and 11) extending upwardly through an annular valve ring 99. Just after the can has been brought into sealing relation, the valve port 98 is brought into communication with a source of vacuum indicated at 100. This is accomplished by means of a valve shoe 101 which is provided with a port cavity 102 (Figs. 8, 11 and 12). The valve shoe 101 engages the upper surface of the annular valve ring 99 and as the valve ring turns under the shoe, one of the valve ports 98 will be brought into register with the shoe cavity 102 and as the valve cavity 102 of the shoe is in communication with the source of vacuum, each can will be vacuumized when the valve ring 99 turns to present its related valve port 98 into registration with the valve cavity 102 of the shoe. The length of the valve cavity determines the length of time during which the source of vacuum is in communication with the interior of the sealed can. This of course may be made to suit the particular operating condition as, for example, I have found in actual practice when applying sauce to sardine cans that a valve shoe six inches in length having a valve cavity two inches in length and a two inch land between each end of the valve cavity 102 and the end of the shoe give the proper degree of vacuumization to the cans.

The vacuum valve shoe 101 is provided with an upstanding pipe section 103 slidably supported in the frame bracket 104 and the shoe is yieldingly maintained in operative contact with the annular valve ring 99 by means of the spring 105 coiled around the pipe section and acting between the frame bracket and the shoe. The upper end of the pipe section 103 is connected to the source of vacuum by means of the hose 106 or other suitable flexible form of tubing.

I prefer to provide a supply of sauce directly upon the turret structure and for this purpose I provide the sealing disc 96 with a cylindrical side wall 107 thus forming a tank or receptacle 108 from which the sauce is supplied to the cans. This tank may be supplied from an outside source through a common type of float valve or may be manually controlled by an ordinary form of valve. The supply of sauce to the tank forms no part of this invention and will not be described in further detail.

As disclosed in Figs. 6 and 9, for each of the sealing means there is provided two ports 109 which communicate with the sauce tank 108. In these figures there is also shown the valve means 110 for controlling the opening and closing of the ports and thereby controlling the supply of sauce to the cans. The valve structure for each of the sealing means is shown in detail in Fig. 7 and includes a yoke like sleeve member 111 journaled upon supporting shaft 112 and having at its lower end the spaced valves 113 and at its upper end a valve actuating disc 114. The valves 113 rotate upon an annular machine surface 115 formed in the upper side of the turret disc 96 and are yieldingly maintained in contact with this surface by the spring means 116 acting between the upper end of the sleeve member 111 and the lower of a pair of nuts 117 which nuts clamp the upper end of supporting shaft 112 to the brace ring 118.

After the can has been elevated into sealing engagement with the temporary sealing means 91 and has been vacuumized and during the time the valve port 98 is passing under the unported or land portion of the valve shoe 101, the valve member 110 is actuated to open the two ports 109 to admit sauce into the vacuumized can. The mechanism for rotating this valve means includes the valve actuating disc 114 fastened to the upper end of the valve yoke 111 and having four actuating cam rollers 119 arranged to engage a retractable stop mechanism 120 during the rotation of the turret and to thereby bring about a 90° rotation of the valve member as it turns past the stop mechanism thereby swinging the valve 113 from the ports 109 and admitting sauce to the vacuumized can.

A second retractable stop means is provided for shutting off the sauce valve after the turret has rotated approximately 90°.

As these two retractable stop means are of the same construction, the same reference characters will be given to each and the description of one will suffice for both.

Referring especially to Figs. 6 and 7, each of the retractable stop means includes a lever 121 pivoted at one end to the frame bracket 122 and having a curved can-engaging portion 123. Lever 121 is yieldingly pressed into can-engaging position by spring 124 acting between the lever and a portion of the frame bracket and is prevented from swinging beyond a predetermined point by means of a stop rod 125 having one end fastened to the lever and extending through slot 126 formed in the frame bracket and having an adjusting nut 127 for engaging the bracket when the spring has swung the lever to its normal can-engaging position. The lever spring 124 surrounds the stop rod 125 as is clearly shown in Fig. 6. The free end of lever 121 is connected to the lower end of the stop lever 128 by means of the angle rod 129 which rod has one end pivotally connected to the lever 121 and passes through an enlarged opening 130 formed in the lower end of stop lever 128 and is yieldingly connected to the lever on one side by the spring 131 surrounding the bent rod and acting between a washer 132 fastened to the rod and the adjacent face of the stop lever 128. The rear end of the bent rod 129 is adjustably engaged with the lower end of the stop lever 128 by means of the nut 133. The stop lever 128 is pivoted to the frame bracket 104 by the pivot shaft 134 and carries at its upper end a stop member 135 passing through a suitable bore in the upper end of the lever and adjustably secured therein by the lock nuts 136.

In the operation of this portion of the machine if the turret is rotating and no cans are being carried by the turret, the lever 121 will not be engaged and actuated and therefore the stop lever 128 will remain in its retracted position as shown in Fig. 7. However, each can carried by the turret will engage the first of the two can-engaging levers 121 and through the mechanism described will swing this stop lever until its stop member 135 is positioned as shown in broken lines in Fig. 7, to intercept the path of travel of the outermost cam roller 119 carried by the valve means 110 whereupon, as the turret rotates, the cam roller will engage the stop member 135 and will cause the sauce valve to rotate until the engaged roller passes from the end of the stop member 135. This action will turn the sauce valve 90° as shown in Fig. 6 and thereby uncover the sauce ports 109 and admitting sauce to the vacuumized can. The sauce valve is opened at about the same time or just after the valve port 98 of the valve ring 99 has passed the end of the vacuum port cavity 102, thereby opening the supply of sauce to the vacuumized can at about the same time the vacuum supply is disconnected, thus preventing the sucking of the sauce through the vacuum supply means.

This opening of the sauce valves to the vacuumized can instantaneously brings about the flow of sauce through ports 109 to the vacuumized can. As it is desirable to vacuumize the can to a moderate degree of vacuum only, the flow of sauce into the can will exhaust the vacuum therein before the can has been completely filled with sauce and in order to insure the complete filling of the can it is therefore necessary to open the sealed can to atmospheric pressure for the remaining portion of the filling operation and it is for this reason that the vacuum valve shoe 101 is of relatively short length, thus permitting the turning of the turret to swing or carry the valve port 98 of the valve ring 99 from the vacuum valve shoe and thereby opening the valve port 98 to atmospheric pressure and thus communicating atmospheric pressure through the passage 97 to the interior of the can. The flow of sauce is continuous until the entire can cavity is completely filled and any air remaining in the can can escape through the passage 97 and port 98 to the atmosphere in the manner described.

Further rotation of the turret will carry the can to the second retractable stop means 120 which will act in the same manner as the first means for turning the sauce valve 110 for a second time through 90°, thus rotating the valves 113 until they close the valve ports 109 as shown in Fig. 6. Shortly after the sauce valve has been closed, the can elevating device 82 will act to lower the can for discharging the same from the filling turret. At about this time the valve port 98 of the valve ring 99 will pass under the compressed air valve shoe 137 which is similar in construction to the vacuum shoe 101 and communicates the shoe with an air pressure supply for the purpose of blowing out any sauce which may have been drawn or which may have found its way into the passage 97, thus clearing the mechanism for the next filling operation. Such sauce as is blown from the passage will be received in the can before the same is discharged from the turret. As the air pressure supply means is of substantially the same construction as the vacuumizing source, a description of the same is not deemed necessary. In some instances the air pressure mechanism may be entirely eliminated.

The can having been returned to the level of the turret table 75 is now discharged from the machine by means of the curved conveyor guide rails 138 and 139 mounted on frame brackets 140 and 141. To assist in discharging the cans, a rotary discharging gate 142 is provided and is driven from the driving means 29 in timed relation with the operation of the turret.

The can discharged from the sauce filling machine is now ready to be conveyed to the can closing machine and like all of the other cans discharged from the machine of this invention, its seaming flange will be cleaned of all foreign material and the sauce added to the cans will stand at the same predetermined level and due to the use of the displacement pad 95 thus providing the necessary head space between the sauce and cover so that the cans treated in this machine are in proper condition to receive the can cover and a perfect sealing of the cover to the can and all such cans will be of substantially the same gross weight for the reason that if there is less fish in one can, a greater amount of sauce will be added and conversely, if there is more fish in another can, less sauce will be necessary to bring the sauce to the predetermined level.

In practice it has been found that cans treated by this invention are all substantially of the same weight and are sealed without cut seams or other defects produced during the double seaming operation.

The two rotary turrets and three rotary can feeding gates are all operated in timed relation from the driving means 29 which driving means as shown in Figs. 1 and 3 includes the necessary sprockets and chains for driving these elements in timed relation, as will be clearly understood by those skilled in the art.

It is not necessary but desirable to provide the driving means with a slip clutch 143 which will slip in case a can jams or some part of the machine should stick. The slip clutch 143 is shown in Fig. 1 and includes a clutch shaft 144 journaled in the machine frame in bearings 145 and 146 to the upper end of which the main driving sprocket 147 is securely fastened. Journaled on the shaft 144 is the main driving gear 148 maintained in frictional driving engagement with the clutch member 149 by means of spring 150 encircling the shaft and acting between the clutch member 149 and the clutch adjusting nut 151 adjustably screw-threaded upon the clutch shaft 144. The clutch member 149 is slidably but not rotatably mounted upon the clutch shaft so that through its frictional engagement the main driving gear 148 will transmit the driving force to the driving mechanism 29. In case a can should become misplaced and jam or some portion of the machine should stick, the main gear 148 may remain stationary while the spring pressed clutch member 149 rotates with the main driving sprocket 147, thus preventing damage to the machine.

Having fully described the invention, it is to be undestood that it is not to be limited to the details herein set forth, but the invention is of the full scope of the appended claims.

I claim:

1. In a machine for cleaning the seaming flange of packed open cans, a frame, a turret table rotatably mounted in said frame, means for serially feeding cans to said table, means for aligning and holding each can on the table in treating register during a predetermined table travel, means for discharging the treated cans, a turret head rotating in unison with said table, can flange cleaning mechanisms carried by said turret head in opposed alignment with said can aligning means, each of said cleaning mechanisms including a compacting member, a rotatably mounted cleaner, and spring means interconnecting said cleaner and turret head means for rotating the turret head, means for serially advancing said compacting and cleaning mechanisms into compacting and cleaning relation with the held cans and after the cleaning operation effecting retraction of said mechanisms, and stop means carried by said frame for serially engaging each of said rotary cleaners prior to its reaching cleaning contact with its aligned can for tensioning said spring and arranged to release said cleaner to effect the cleaning action substantially upon making contact with the can flange.

2. In a machine for cleaning the seaming flange of packed open cans, a frame, a turret table rotatably mounted in said frame, means for serially feeding cans to said table, means for aligning and holding each can on the table in treating register during a predetermined table travel, means for discharging the treated cans, a turret head rotating in unison with said table, can flange cleaning mechanisms carried by said turret head in opposed alignment with said can aligning means, each of said cleaning mechanisms including a rotatably mounted cleaner and spring means interconnecting said cleaner and turret head, means for rotating the turret head, means for serially advancing said cleaning mechanisms into cleaning relation with the held cans and after the cleaning operation effecting retraction of said mechanisms, and stop means carried by said frame for serially engaging each of said rotary cleaners prior to its reaching cleaning contact with its aligned can for tensioning said spring and arranged to release said cleaner to effect the cleaning action substantially upon making contact with said can flange.

3. In a machine for cleaning the seaming flange of packed open cans including a conveyor means for conveying a packed can through a seaming flange cleaning cycle, a seaming flange cleaning mechanism moved in treating register with the can during such movement, said cleaning mechanism including a rotatably mounted cleaner member and spring means for rotating said member, and a stop means arranged to engage the rotary cleaner prior to its reaching cleaning contact with an aligned can for tensioning said spring and arranged to release said cleaner to effect the cleaning action when in cleaning engagement with said can.

4. In a machine for cleaning the seaming flange of packed open cans including a carrier for conveying a packed can through a flange cleaning cycle, a head moved in opposed treating register with the can during such movement, means for compacting the contents of the can carried by said head, a cleaner member rotatably mounted upon said head adjacent said compacting means, spring means for actuating said cleaner interconnecting said cleaner and head, means for moving said head during the cleaning cycle to cause the compacting means to compact the contents of said can and to bring the cleaner member into cleaning relation with the can seaming flange, and a stop means arranged to engage the cleaner member during the movement thereof to tension said spring and thereafter arranged to release said cleaner member to effect the cleaning action.

CLYDE D. RUSSELL.